United States Patent
Queveau et al.

(10) Patent No.: US 7,121,602 B2
(45) Date of Patent: Oct. 17, 2006

(54) SHELF ASSEMBLY FOR A VEHICLE

(75) Inventors: Gerard Queveau, Le Pin (FR); Paul Queveau, Montravers (FR); Jean-Marc Guillez, Cirieres (FR)

(73) Assignee: Societe Europeenne de Brevet Automobiles, Paris ( * ) Notice: Subject to any disclaimer, the term of this patent is extended or adjusted under 35 U.S.C. 154(b) by 0 days.

(21) Appl. No.: 10/517,127

(22) PCT Filed: Feb. 18, 2004

(86) PCT No.: PCT/FR2004/000380

§ 371 (c)(1),
(2), (4) Date: Sep. 29, 2005

(87) PCT Pub. No.: WO2004/078520

PCT Pub. Date: Sep. 16, 2004

(65) Prior Publication Data

US 2006/0091686 A1    May 4, 2006

(30) Foreign Application Priority Data

Feb. 28, 2003  (FR) .................................. 03 02490
Sep. 29, 2003  (FR) .................................. 03 11378

(51) Int. Cl.
*B60J 7/20* (2006.01)
*B62D 25/10* (2006.01)

(52) U.S. Cl. ............................. 296/24.44; 296/107.08; 296/76; 296/136.03

(58) Field of Classification Search ............. 296/24.44, 296/76, 107.08, 136.01, 13.03–136.06, 37.16
See application file for complete search history.

(56) References Cited

U.S. PATENT DOCUMENTS

| | | | | |
|---|---|---|---|---|
| 2,934,248 A | * | 4/1960 | Lown | 224/542 |
| 4,198,091 A | * | 4/1980 | Appleton | 296/63 |
| 5,090,764 A | * | 2/1992 | Kogawa et al. | 296/107.08 |
| 5,209,544 A | * | 5/1993 | Benedetto et al. | 296/107.18 |
| 6,352,298 B1 | | 3/2002 | Hayashi et al. | |
| 6,364,396 B1 | | 4/2002 | Hayashi et al. | |
| 6,386,615 B1 | * | 5/2002 | Neubrand et al. | 296/76 |
| 6,663,163 B1 | * | 12/2003 | Koch | 296/107.08 |
| 6,814,390 B1 | * | 11/2004 | Habacker | 296/107.08 |
| 6,840,563 B1 | * | 1/2005 | Fuchs et al. | 296/107.08 |
| 7,017,971 B1 | * | 3/2006 | Guillez et al. | 296/107.08 |
| 7,032,947 B1 | * | 4/2006 | Queveau et al. | 296/24.44 |
| 2001/0004156 A1 | | 6/2001 | Neubrand et al. | |
| 2002/0135201 A1 | | 9/2002 | Liedmeyer et al. | |

FOREIGN PATENT DOCUMENTS

FR    2 842 467    1/2004

* cited by examiner

*Primary Examiner*—D. Glenn Dayoan
*Assistant Examiner*—Greg Blankenship
(74) *Attorney, Agent, or Firm*—Fish & Richardson P.C.; Richard P. Gilly

(57) ABSTRACT

The package shelf (3) comprises sliders (47) which are moveable in relation to the frame (46) of the vehicle, a shelf (48) which can move along two tracks (46) which are fixed to the frame (45) and along the sliders (47), and driving means whereby a first part thereof is fixed to the shelf (48) and the second part thereof cooperates with the first part and is fixed to the sliders (47). The arrangement of the shelf (48), sliders (47), tracks (46), frame (45) and driving means, which are mounted independently from the frame (45), enable the shelf (48) to be displaced in relation to the latter.

11 Claims, 3 Drawing Sheets

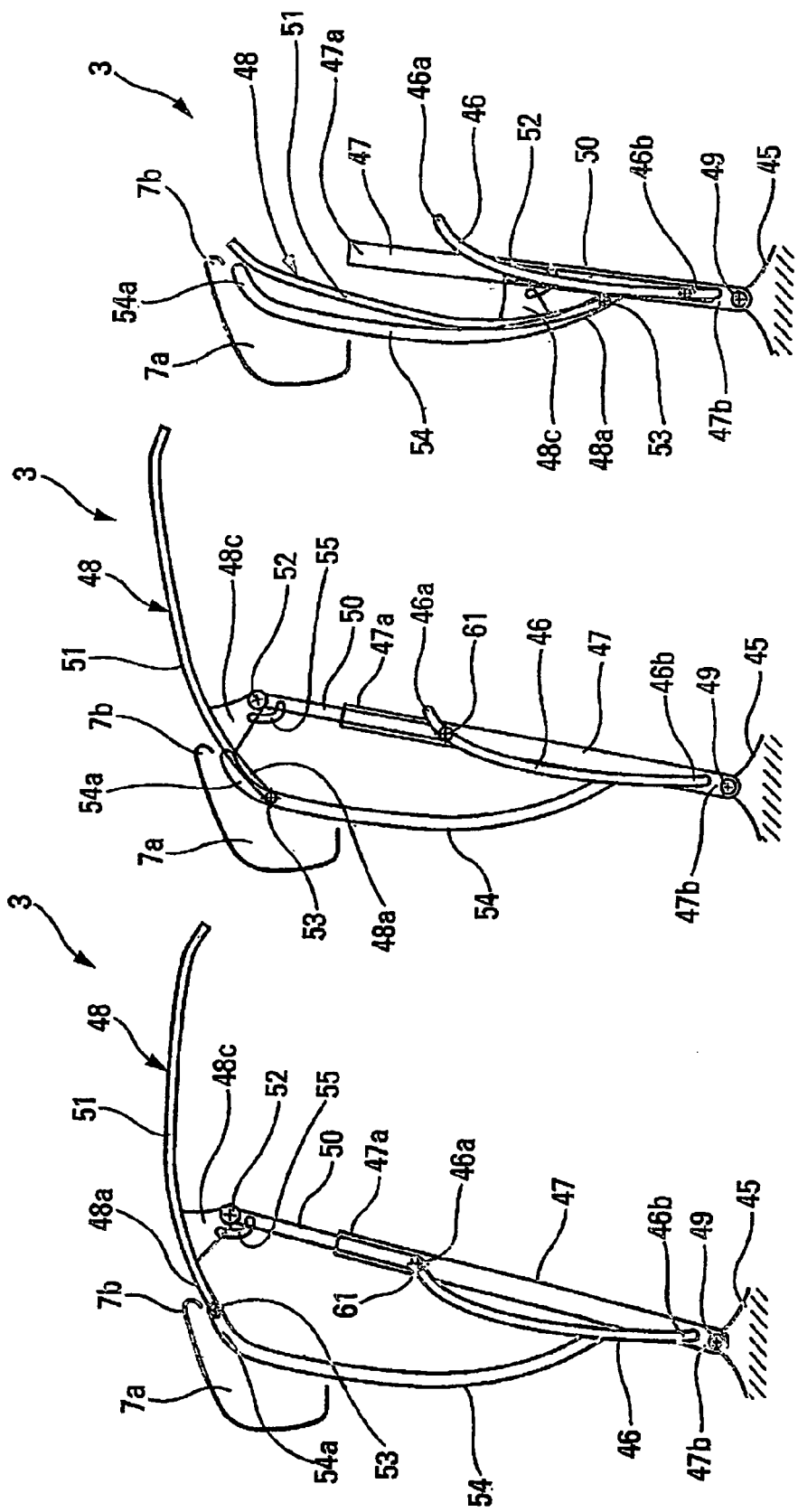

SHELF ASSEMBLY FOR A VEHICLE

TECHNICAL FIELD

The invention relates to a shelf assembly for a vehicle, notably for a vehicle comprising a movable rigid roof collapsible into the rear boot.

BACKGROUND

We know of a shelf assembly of the type comprising a shelf capable of being mounted, in a movable manner, onto two tracks between, on one hand, a deployed position in which it covers the area located between the front edge of the rear boot hood of the vehicle and the backrest of the seat delimiting the boot, and on the other hand, a retracted position in which it uncovers this area, each track being fixed to a support element of the vehicle and substantially extending along the longitudinal direction of the vehicle, means for driving, which comprise a first part integral to the shelf and a second part co-operating with the first part, being capable of displacing the shelf from one of its positions to another.

Such a shelf is disclosed in the document FR 02 09215. In this document, the tracks and the second part of the means for driving are integral to the rear boot hood. In a known manner, the means for driving generate an actuating force on the shelf and the counter force on the hood, which allows to displace the shelf in relation to the hood.

However, the assembling of such a shelf assembly on a vehicle is not easy. Indeed, the first part of the means for driving need to be accurately arranged in relation to the second part in order to allow the shelf to be displaced, which is delicate due to the restricted access to these means for driving.

The problem in question is to make a shelf assembly in the form of an independent unit that can be delivered as a kit, whose assembly onto the vehicle does not require any work to the means for driving.

SUMMARY

One solution is a shelf assembly of the aforementioned type comprising means for support onto which the shelf is mounted in a movable manner, and which are capable of being mounted in a movable manner onto the support element, the second part of the means for driving being integral to the means for support, the displacement of the shelf in relation to the means for support compelling the displacement of the shelf from one of its positions to another and the displacement of the means for support in relation to the support element of the vehicle.

Thus, according to the invention, the shelf assembly comprises the shelf, the means for support and the means for driving which generate an actuating force on the shelf and the corresponding counter force on the means for support, the tracks only being used to guide the movement of the shelf.

Thus, the package of a shelf assembly, according to the invention, onto a vehicle is particularly simple: the means for support are mounted onto the support element, and the shelf is mounted along the tracks. The accurate positioning in respect to both of the two parts of the means for driving is done at the time of assembling the shelf assembly during which time there is easy access to the means for driving, the shelf assembly being easier to handle.

According to a first embodiment, the support element, to which the tracks are integral and onto which the means for support are mounted, is the rear boot hood.

According to an alternative of this first embodiment, the tracks and the means for support are configured so that the shelf is capable of being arranged under the hood when in its retracted position.

According to another alternative of this first embodiment, the means for support are made of two sliders which are capable of substantially extending along the longitudinal direction and on either side of the vehicle, and which are swivel mounted onto the hood, the shelf being slide mounted along the sliders and both swivel and slide mounted along the tracks.

According to a second embodiment, the support element, to which the tracks are integral and onto which the means for support are mounted, is the frame of the vehicle.

According to an alternative of this second embodiment, the tracks and the means for support are configured so that the shelf is capable of being arranged behind the backrest delimiting the rear boot when in its retracted position.

According to another alternative of this second embodiment, the means for support are made of two sliders which are capable of substantially extending along a direction sloping in relation to the horizontal, preferably the vertical direction and on either side of the vehicle, and which are swivel mounted onto the frame, the shelf being slide mounted along the sliders and both swivel and slide mounted along the tracks.

According to a particularly advantageous alternative of the second embodiment, the shelf comprises a substantially plane surface creating the actual shelf and torque arms which support the guiding elements ensuring the mechanical link of the shelf to the tracks and the means for support, and which are articulated to the substantially plane surface so that, when the shelf is in its deployed position, the substantially plane surface is in a substantially horizontal position and, when the shelf is in its retracted position, the substantially plane surface is in an inclined position in relation to the horizontal, preferably in a substantially vertical position.

This endows a gain in space and constitutes a mechanically simple and reliable solution. The shelf can be swivelled behind the backrest delimiting the rear boot, in order to allow way for the retractable roof, whilst limiting the encumbrance of the driving device of the shelf.

DESCRIPTION OF THE DRAWINGS

Other advantages and features will come from the following detailed description of the embodiment given by way of illustration and non-restrictive and illustrated in the annexed drawings in which:

FIG. 6 is a longitudinal cross section of the rear part of a vehicle fitted with a shelf assembly in accordance with a preferred second embodiment of the invention, the shelf being in the deployed position;

FIG. 7 is a similar view to that in FIG. 6, the shelf being in the retracted position; and FIG. 8 is a similar view to that in FIGS. 6 and 7, the shelf being in an intermediate position between its deployed and retracted positions.

DETAILED DESCRIPTION

Figure 1:
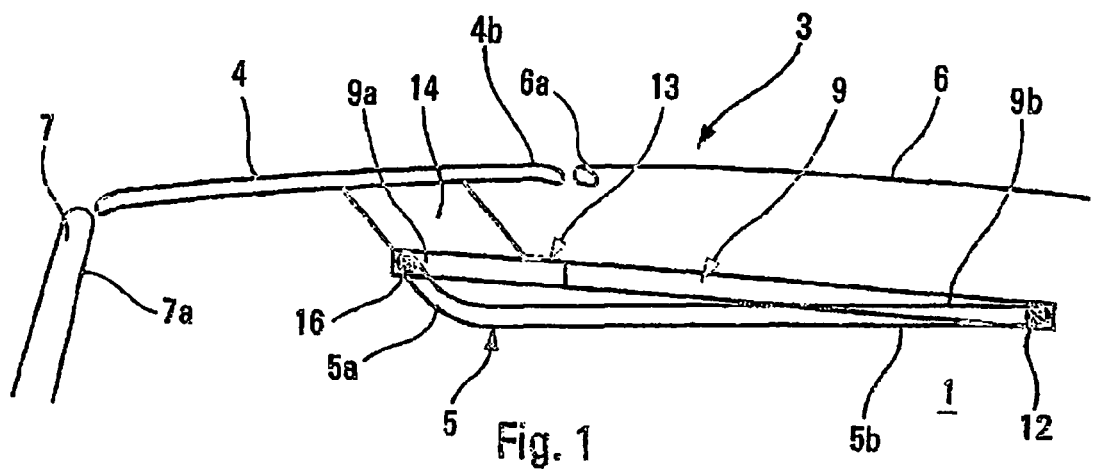
FIG. 1 is a longitudinal cross section of the rear part of a vehicle fitted with a shelf assembly in accordance with a first embodiment of the invention, the shelf being in the deployed position.
Figure 2:
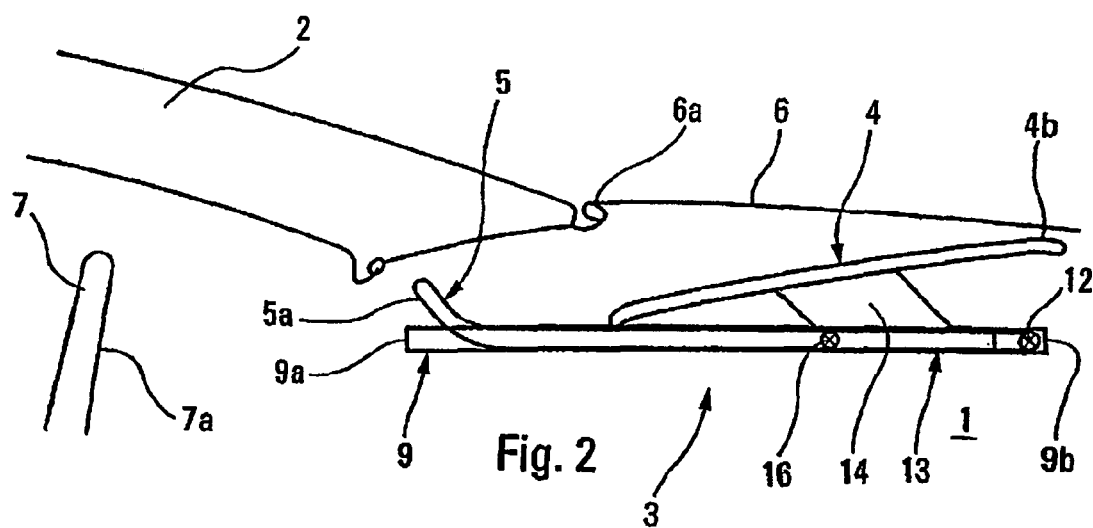
FIG. 2 is a similar view to that in FIG. 1, the shelf being in the retracted position.

In these examples, as can be seen in FIGS. 1 and 2, a vehicle comprises a rear boot 1 and a rigid fold-away roof 2.

The roof 2 is movable between a deployed position in which it covers the passenger compartment of the vehicle, and a retracted stored position in which it is folded away in the rear boot 1.

The vehicle also comprises a shelf assembly 3 which comprises a shelf 4, 48. The shelf 4, 48 is mounted in a movable manner along the two parallel tracks 5, 46 which are fixed to a support element 6, 45 of the vehicle and which substantially extend, on each side of this element, along the longitudinal direction of the vehicle. The shelf 4, 48 is movable between a deployed position and a retracted position. When it is in the deployed position, the shelf 4, 48 covers the area which lies between the front edge 6a of the hood 6 and the backrest 7a of the seat 7 delimiting the boot 1 (FIG. 1), and when it is in the retracted position, the shelf 4, 48 uncovers this area (FIG. 2). Means for driving 8 are capable of displacing the shelf 4, 48 from one of its positions to another.

According to the invention, the shelf assembly 3 also comprises means for support 9, 47 and means for driving 8.

The shelf 4, 48 is mounted in a movable manner onto the means for support 9, 47 which are mounted in a movable manner onto the support element 6, 45 to which the tracks 5, 46 are attached.

The means for driving 8 comprise a first part 10 and a second part 11. The first part 10 is fixed to the shelf 4, 48 and the second part 11 is fixed to the means for support 9, 47. Thus, the means for driving 8 generate the displacement of the shelf 4, 48 in relation to the means for support 9, 47. This relative movement, the assembly of the shelf 4, 48 in the tracks 5, 46 and the assembly of the means for support 9, 47 onto the support element 6, 45, allow the shelf 4, 48 to be displaced from one of its positions to another.

The shape of the tracks 5, 46 in the longitudinal and vertical directions is adapted to the pre-set kinematics of the shelf 4, 48.

In the first embodiment illustrated in FIGS. 1 to 5, the hood 6 of the rear boot 1 is the support element to which are fixed the tracks 5 and onto which are mounted the means for support 9, the shelf 4 being arranged under the hood 6 when it is in its retracted position.

In the example illustrated in FIGS. 1 to 4, each track 5 mainly extend along the longitudinal direction and is substantially horizontal along the best part of its length, its front end 5a creating a curve which extends forwards and upwards, which allows the shelf 4 to slide under the hood 6 and, when close to its deployed position, i.e. when its rear edge 4b is close to the front edge 6a of the hood 6, to be displaced upwards in order to practically meet up with the latter.

In this example the tracks 5 are made via cupping on the inside face 6b of the hood 6.

In these examples, the means for support 9 are made of two parallel sliders 9 which are straight, substantially extending along the longitudinal direction on either side of the vehicle and are swivel mounted onto the hood 6 between a retracted position in which the shelf 4 is in its retracted position, and a deployed position in which the shelf 4 is in its deployed position. Each slider 9 is swivel mounted onto the hood 6 about a swivel pin 12 located at the rear end 9b of the slider 9. Irrespective of their position, the sliders 9 mainly extend along the longitudinal direction.

The shelf 4 comprises two guiding elements 13, each of them being fixed to a corresponding transversal edge 4c of the shelf 4 via a torque arm 14. The substantially plane surface creating the actual shelf, the guiding elements 13 and the torque arm 14 create a substantially non-malleable shelf 4. Each guiding element 13 is capable of ensuring the mechanical link between, on one hand, the shelf 4 and, on the other hand, the corresponding slider 9 and track 5.

Figure 3:
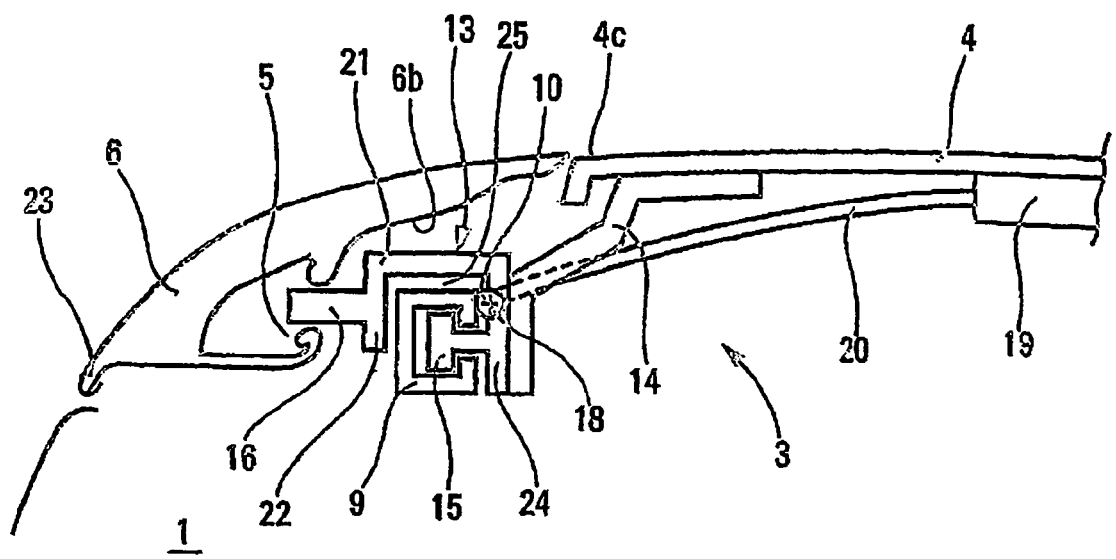
FIG. 3 is a transversal cross section of the left end of the shelf assembly.
Figure 4:
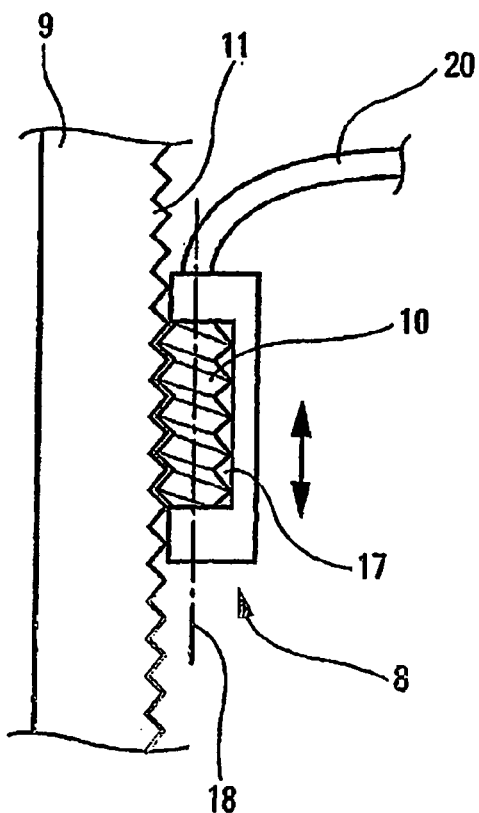
FIG. 4 is a top view of a detail in FIG. 3.

In the example illustrated in FIG. 3, each guiding element 13 comprises a roller 15 by which the shelf 4 is slide mounted along the corresponding slider 9, and a cam pin 16 by which the shelf 4 is both swivel and slide mounted along the corresponding track 5.

In this example, the first part 10 of the means for driving 8 is made of two worms 10 and the second part 11 of the means for driving 8 is made of two racks 11. Each of the racks 11 is mounted along a corresponding slider 9 and substantially extends, for this reason, along the longitudinal direction of the vehicle. Each worm 10 is housed in a cavity 17 made in the corresponding guiding element 13 and is rotary mounted in this cavity 17 about an axis of rotation 18 substantially extending along the longitudinal direction of the vehicle, so as to co-operate with the corresponding rack 11.

Moreover, a motor 19 is fixed to the internal surface of the shelf 4 and means for transmitting 20, for example flexible drive shafts, allow to transmit the movement of the motor shaft 19 to the two worms 10.

On each side of the vehicle, the track 5, the slider 9 and the guiding element 13 are fitted so that, when a guiding element 13 is close to the rear end 9b of the corresponding slider 9, it is also close to the rear end 5b of the corresponding track 5, the slider 9 being in its retracted position and the shelf 4 being in its retracted position (FIG. 2). Now, when it is close to the front end 9a of the corresponding slider 9, it is also close to the front end 5a of the corresponding track 5, the slider 9 being in its deployed position and the shelf 4 being in its deployed position (FIG. 1).

The movement of the shelf 4 from one of its positions to another, in relation to the hood 6, is generated in the following manner: each worm 10 is rotary driven in either direction by the means for transmitting 20 and co-operates with the corresponding rack 11 so as to drive the translation of each roller 15 along the corresponding slider 9. The sliders 9 being linked to the hood 6 via their swivel pin 12, their translation in relation to the hood 6 is impossible and, for this reason, the two rollers 15 and the two cam pins 16 have the same movement of translation in relation to the hood 6. Each cam pin 16 swivels and slides along the corresponding track 5 so as to impose its trajectory on the shelf 4, each roller 15 sliding along the corresponding straight slider 9 which swivels in relation to the hood 6 so as to allow the displacement of the shelf 4 in relation to the hood 6.

In the example illustrated in FIG. 3, each guiding element 13 has an inverted U-shaped structure and possesses a substantially horizontal base wall 21, an external side wall 22 which extends downwards from the base wall 21 and which is placed on the side of the side rim 23 of the hood 6, and an internal side wall 24 which extends downwards from the base wall 20 and which is placed on the side of the median wall of the hood 6.

The cam pin 16 transversally projects outwards in relation to the external side wall 22 in the direction of the side rim 23 and penetrates into the corresponding track 5 which is made along this rim 23. The roller 15 transversally projects outwards in relation to the internal side wall 24 into the housing 25 which is delimited by the U-shaped structure, and penetrates into the slider 9 which has a relative sliding movement in this housing 25. This special sizing of the guiding element 13 renders the shelf assembly 3 particularly compact.

Figure 5:
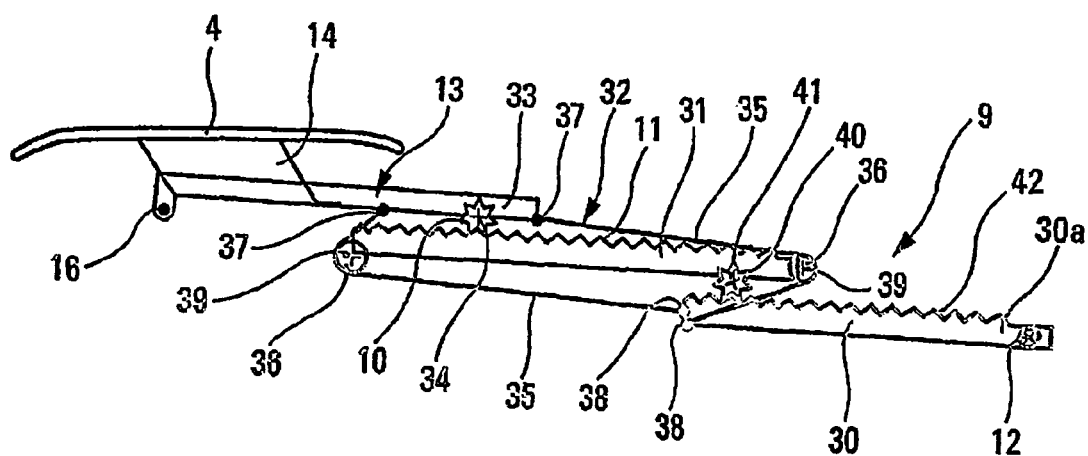
FIG. 5 is a longitudinal cross section of a shelf assembly in accordance with an alternative of the first embodiment of the invention, the shelf being in the deployed position.

In the example illustrated in FIG. 5, each slider 9 is telescopic so as to take up as little space as possible in the retracted position. Each slider 9 comprises, for this purpose, a rear element 30, a front element 31 and means for transmitting 32.

The rear element 30 is swivel mounted onto the hood 6 about a swivel pin 12 which is located to the rear 30*b* of the rear element 30. The front element 31 is slide mounted along the rear element 30, the shelf 4 being slide mounted along the front element 31.

In this example, the guiding element 13 comprises a support blade 33 by which the shelf 4 is slide mounted along the front element 31.

On each side of the shelf assembly, the first part 10 of the means for driving 8 is made of a pinion 10 which is mounted on the support blade 33 via an axis of rotation 34 transversal to the vehicle and which is meshed with the rack 11 which extends along the front element 31. Thus, the rotating of the pinion 10 drives the sliding of the shelf 4 along the front element 31.

The means for transmitting 32 allow to generate the sliding of the rear element 30 in relation to the front element 31. For this reason, the means for transmitting 32 comprise, for each slider 9, two connecting cables 35 and two transmitter pulleys 36.

Each connecting cable 35 is fixed, at its first end 37, to the support blade 33 and at its second end 38 tot he rear element 30. Each connecting cable 35 is wound around a corresponding transmitter pulley 36 which is mounted onto a corresponding end of the front element 31 via an axis of rotation 39 transversal to the vehicle. Furthermore, a drive pinion 40 which is mounted onto the front element 31 via an axis of rotation 41 transversal to the vehicle, is meshed with the drive rack 42 which extends along the rear element 30.

Thus, the rotation of the pinion 10 in either direction directly drives the relative displacement of the shelf 4 in relation to the front element of the slider 31. Due to this relative displacement, and the presence of the connecting cables 35, the drive pinion 40 and the drive rack 42, the front element 31 slides, in relation to the rear element 30, in the same direction as that of the sliding of the support blade 33 in relation to the front element 31.

By means of such a slider 9, using sliding elements bearing, in the longitudinal direction, the same dimension as the shelf 4, the unit created by the shelf 4 and the sliders 9 only takes up, in the longitudinal direction, the length of the shelf 4 when the latter is in its retracted position.

In the second preferred embodiment illustrated in FIGS. 6 to 8, the frame 45 of the vehicle is the supporting element to which the tracks 46 are fixed and onto which are mounted the means for support 47, the shelf 48 being arranged behind the backrest 7*a* of the seat 7 delimiting the boot 1 when it is in its retracted position.

In the example illustrated in FIGS. 6 to 8, each track 46 mainly extends along the vertical direction and is substantially vertical on the best part of its length, its upper end 46*a* creating a curve which extends backwards and upwards, which allows the shelf 48 to slide behind the backrest 7*a*, when it is close to its deployed position, i.e. when its front edge 48*a* comes close to the upper rear end 7*b* of the backrest 7*a*, to be displaced backwards in order to practically meet up with the latter.

In these examples, the means for support 47 are made of two parallel sliders 47 which are straight, substantially extending along the vertical direction on either side of the vehicle and are swivel mounted onto the frame 45 between a retracted position in which the shelf 48 is in its retracted position, and a deployed position in which the shelf 48 is in its deployed position. Each slider 47 is swivel mounted onto the frame 45 about a swivel pin 49 located at the internal end 9*b* of the slider 47. Irrespective of their position, the sliders 47 mainly extend along the vertical direction.

The shelf 48 comprises two guiding elements (not represented) similar to those represented in FIG. 3 and which then allow the displacement of the shelf 48 in relation to the frame 45. Thus, each-guiding element is slide mounted along the corresponding slider 47, by means of a roller (similar to the roller 15 in FIG. 3) in a swivel and slide manner along the corresponding track 46, by means of a cam pin 61 (similar to the cam pin 16 in FIG. 3), so that, when it is close to the lower end 47*b* of the slider 47, it is also close to the lower end 46*b* of the track 46, and when it is close to the upper end 47*a* of the slider 47, it is also close to the upper end 46*a* of the track 46.

So that, in the second embodiment, the shelf 48 is in a substantially vertical position when it is in its retracted position, the torque arms 50 supporting the guiding elements of the shelf 48, and the substantially plane surface 51 creating the actual shelf are articulated about each other. Thus, when the shelf 48 is in its deployed position, the substantially plane surface 51 is in a substantially horizontal position allowing to cover the area located between the front edge 6*a* of the hood 6 and the backrest 7*a* of the seat 7 delimiting the boor 1 and, when the shelf 48 is in its retracted position, the substantially plane surface 51 is in a substantially vertical position allowing it to be stored behind the backrest 7*a* of the seat 7 delimiting the boot 1.

This articulation allows the shelf assembly 3 to be of reduced size.

In this example, the substantially plane surface 51 is linked, in a swivel manner, to the torque arm 50 via an axis of rotation 52 which is oriented along the transversal direction of the vehicle.

In this example, the articulating of the substantially plane surface 51 in relation to the torque arms 50 is controlled by the displacement of the torque arms 50 in relation to the frame 45. The substantially plane surface 51 comprises, on each side, at the front end of its side walls, a stub 53 which is swivel and slide mounted along a corresponding ramp 54 which is integral to the frame 45 and which substantially extends along the vertical direction.

For this reason, the displacement of the torque arms 50 in relation to the frame 45, the articulated connection of the substantially plane surface 51 to the torque arms 50, and the assembly of the stubs 53 in the ramps 54 which are fixed to the frame 45, allow the substantially plane surface 51 to be correctly oriented as the displacement of the torque arms 50 and the entire shelf 48 progresses.

The shape of the ramps 54 in the longitudinal and vertical directions is adapted to pre-set kinematics of the substantially plane surface 51. In this example, each ramp 54 moves from its deployed position to its retracted position.

The ramps allow to tilt the substantially plane surface 51 towards the front of the vehicle when the shelf 48 moves from its deployed position to its retracted position.

Each ramp 54 is substantially vertical on the best part of its length, and its upper end 54a creates a curve which extends backwards and terminates substantially horizontally, which allows the substantially plane surface 51 to be in a substantially horizontal position when the shelf 48 is in its deployed position.

Furthermore, in this example, a means for retracting 55 (such as a spring) linked, on one hand, to a part of the substantially plane surface 51 and, on the other hand, to the corresponding torque arm 50 constantly solicits the substantially plane surface 51 in its substantially horizontal position.

The use of a means for retracting 55 and the fact that the displacement of the torque arms 50 in relation to the frame 45 drives the orientation of the substantially plane surface 51 allows to restrict the number of components and therefore to have a shelf assembly 3 of particularly reduced encumbrance.

Of course, the sliders can be telescopic, as in the case illustrated in FIG. 5.

In the examples, the vehicle comprises means for controlling the synchronising (not represented) of the movements of the shelf 4, 48 and of the roof 2 so that, when the roof 2 is in its deployed or retracted stored positions, the shelf 4, 48 is respectively in its retracted or deployed positions.

The shelf assembly can comprise a second shelf (not illustrated) which will be mounted, in a movable manner, between a deployed position in which it covers the area located between the rear edge of the roof in the deployed position and the backrest of the seat delimiting the boot, and a retracted position in which it is placed along the rear window and uncovers this area. The means for controlling the synchronising of the movements are such that, when the roof is in its deployed position, the first shelf is in its retracted position and the second shelf is in its deployed position and, when the roof is in its retracted stored position, the first shelf is in its deployed position, and the second shelf is in its retracted position.

The shelf assembly in accordance with the invention creates an independent unit capable of being mounted onto a vehicle.

Of course, the shelf assembly is not restricted to the specific embodiment described in detail.

For example, the tracks 5 could be fixed to the internal face 6b of the hood 6, via screwing or welding and, for this purpose, be a part of the shelf assembly unit.

For example, the means for displacing could be created by the actuators whose rod will be integral to the shelf 4, 48 and the cylinder will be integral to the means for support 9, 47, or inversely.

For example, in the second embodiment, the tracks could be fixed to the seat (to the backrest) delimiting the rear boot, and not to the frame.

What is claimed is:

1. On a vehicle having a longitudinal direction and comprising a frame, a rear boot, a hood on said rear boot, said hood having a front edge and a rear end on said longitudinal direction, and a seat having a backrest disposed close to a front end of said boot; a shelf assembly comprising:

a movable shelf adapted to be mounted, in a movable manner, onto two tracks between a deployed position in which said movable shelf essentially covers an area located between the front edge of the hood and the backrest of the seat, and a retracted position in which it uncovers said area, each track extending along said longitudinal direction of the vehicle and being fixed to one of the hood and a support element attached to the frame of said vehicle, driving means comprising a first part fixed to the movable shelf and a second part engaging the first part, said driving means being adapted to displace the movable shelf between said respectively deployed and retracted positions, and, supporting means onto which the movable shelf is mounted in a movable manner, and which are adapted to be mounted in a movable manner onto the support element, the second part of the driving means being fixed to the supporting means, and the displacement of the movable shelf (4, 48) with respect to the supporting means compelling the displacement of the shelf between said respectively deployed and retracted positions and the displacement of the supporting means with respect to said one of the hood and the support element.

2. The shelf assembly set forth in claim 1, wherein the supporting means comprise two sliders which are adapted to extend on either side of the vehicle, transversally to said longitudinal direction thereof and which are swivel mounted onto said one of the hood and the support element, the shelf being slide mounted along the sliders and both swivel and slide mounted along the tracks.

3. The shelf assembly set forth in claim 2, wherein the movable shelf comprises two guiding elements, each of which is slide mounted along the corresponding slider and in a swivel and slide manner along the corresponding track.

4. The shelf assembly set forth in claim 3, wherein the driving means comprise two racks and two worms, each rack being mounted along the corresponding slider, and each worm (10) engaging the corresponding rack (11) and being rotary mounted onto the corresponding guiding element (13) about an axis of rotation (18) substantially extending along said longitudinal direction.

5. The shelf assembly set forth in claim 3, wherein:
said one of the hood and the support element has a side rim, a median part and,
each guiding element (13) has an inverted U-shaped structure and has a base wall (21), an external side wall (22) extending from the base wall (21) and placed near said side rim (23), and an internal side wall (24) extending from the base wall (20) and placed near said median part.

6. The shelf assembly set forth in claim 1, wherein:
the tracks are fixed to said hood, and,
the tracks (5) and the supporting means (9) are configured so that the shelf (4) is adapted to being placed under the hood (6) when in its retracted position.

7. The shelf assembly set forth in claim 6, wherein:
the supporting means comprise sliders which are adapted to extend on either side of the vehicle, transversally to said longitudinal direction thereof and which are swivel mounted onto said hood, the movable shelf being slide mounted along the sliders and both being swivel and slide mounted along the tracks, and,
each slider (9) is swivel mounted onto the hood (6) at its rear end (9b) and is adapted to extend along a substantially horizontal direction.

8. The shelf assembly set forth in claim 1, wherein:

the tracks are fixed to the frame (45) of the vehicle, and, the tracks (46) and the supporting means (47) are configured so that the shelf (48) is adapted to be arranged along the backrest (7*a*) of the seat (7) (1) when in its retracted position.

9. The shelf assembly set forth in claim 8, wherein:

the movable shelf comprises two guiding elements, each slide mounted along the corresponding slider and in a swivel and slide manner along the corresponding track, and, when one of said guiding elements (13) is close to a lower end (47*b*) of the slider (47), it is also close to a lower end (46*b*) of the track (46), and when it is close to a upper end (47*a*) of the slider (47), it is also close to a upper end (46*a*) of the track (46).

10. The shelf assembly set forth claim 3, wherein the movable shelf (48) comprises a substantially plane plate and two torque arms (50) which support the guiding elements (13) and which are articulated with respect to said (13) and which are articulated with respect to said substantially plane plate so that, when the shelf (48) is in its deployed position, the substantially plane plate is in a substantially horizontal position and, when the shelf (48) is in its retracted position, the substantially plane plate is in an inclined position with respect to the horizontal.

11. The shelf assembly set forth in claim 10, wherein:

the tracks are fixed to said frame of the vehicle, the tracks and the supporting means are configured so that said movable shelf is adapted to be arranged along the backrest of the seat when in its retracted position, and, the articulating of the substantially plane plate with respect to the torque arms (50) is controlled by the displacement of the torque arms (50) with respect to the frame (45).

* * * * *